United States Patent
Bohling et al.

(10) Patent No.: US 10,287,450 B2
(45) Date of Patent: May 14, 2019

(54) AQUEOUS DISPERSION OF POLYMER PARTICLES WITH ACORN MORPHOLOGY

(71) Applicant: Rohm and Haas Company, Collegeville, PA (US)

(72) Inventors: James C. Bohling, Lansdale, PA (US); Arnold S. Brownell, Lansdale, PA (US); Andrew Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/830,245

(22) Filed: Dec. 4, 2017

(65) Prior Publication Data

US 2018/0163080 A1    Jun. 14, 2018

Related U.S. Application Data

(60) Provisional application No. 62/432,061, filed on Dec. 9, 2016.

(51) Int. Cl.

| | | |
|---|---|---|
| *C08L 33/08* | (2006.01) | |
| *C09D 143/02* | (2006.01) | |
| *C09D 7/40* | (2018.01) | |
| *C09D 125/14* | (2006.01) | |
| *C09D 133/08* | (2006.01) | |
| *C09D 133/12* | (2006.01) | |
| *C08F 265/06* | (2006.01) | |
| *C09D 151/00* | (2006.01) | |
| *C08F 2/22* | (2006.01) | |
| *C08F 212/08* | (2006.01) | |
| *C08F 220/14* | (2006.01) | |
| *C08F 220/18* | (2006.01) | |
| *C08K 3/22* | (2006.01) | |
| *B82Y 30/00* | (2011.01) | |
| *C08F 12/30* | (2006.01) | |

(52) U.S. Cl.
CPC .............. *C09D 143/02* (2013.01); *C08F 2/22* (2013.01); *C08F 265/06* (2013.01); *C09D 7/70* (2018.01); *C09D 125/14* (2013.01); *C09D 133/08* (2013.01); *C09D 133/12* (2013.01); *C09D 151/003* (2013.01); *B82Y 30/00* (2013.01); *C08F 12/30* (2013.01); *C08F 212/08* (2013.01); *C08F 220/14* (2013.01); *C08F 2220/1825* (2013.01); *C08K 2003/2241* (2013.01); *C08L 2207/53* (2013.01)

(58) Field of Classification Search
CPC ...... C09D 143/02; C09D 7/70; C09D 125/14; C09D 133/08; C09D 133/12; C08F 265/06; C08L 33/08
USPC .......................................................... 523/201
See application file for complete search history.

(56) References Cited

U.S. PATENT DOCUMENTS

| | | | |
|---|---|---|---|
| 7,179,531 B2 | 2/2007 | Brown et al. | |
| 9,469,758 B2* | 10/2016 | Bohling | C08L 33/08 |
| 9,475,932 B2* | 10/2016 | Brownell | C09D 7/43 |
| 9,499,691 B2 | 11/2016 | Bohling et al. | |
| 9,920,194 B2* | 3/2018 | Bohling | C08L 33/08 |
| 2015/0011695 A1* | 1/2015 | Bohling | C09D 7/65 |
| | | | 524/521 |
| 2015/0315406 A1 | 11/2015 | Bohling et al. | |
| 2016/0040004 A1 | 2/2016 | Brownell et al. | |
| 2016/0168414 A1* | 6/2016 | Li | C08F 212/08 |
| | | | 523/205 |

FOREIGN PATENT DOCUMENTS

EP    1798258    6/2007

OTHER PUBLICATIONS

Andreas Walther et al: "Janus Particles: Synthesis, Self-Assembly, Physical Properties, and Applications", Chemical Reviews, vol. 113, No. 7, Apr. 4, 2013 (Apr. 4, 2013).
Jaewon Yoon et al: "Multifunctional polymer particles with distinct compartments", Journal of Materials Chemistry, vol. 21, No. 24, Apr. 28, 2011 (Apr. 28, 2011), p. 8502.
Search report from corresponding European 17204242.6-1102 application, dated May 3, 2018.

* cited by examiner

*Primary Examiner* — Hannah J Pak
(74) *Attorney, Agent, or Firm* — Reid S. Willis

(57) ABSTRACT

The present invention relates to a composition comprising 1) an aqueous dispersion of polymer particles having a core-shell morphology wherein the core protuberates from the shell and comprises less than 0.09 structural units of a phosphorus acid monomer, based on the weight of the core; and 2) pigment particles with a refractive index in the range of from 2.0 and 3.0, wherein the pigment volume concentration of the pigment particles is at least 11. The composition of the present invention is useful for improving block resistance in coatings applications.

10 Claims, No Drawings

AQUEOUS DISPERSION OF POLYMER PARTICLES WITH ACORN MORPHOLOGY

BACKGROUND OF THE INVENTION

The present invention relates to a coating composition comprising an aqueous dispersion of polymer particles with acorn morphology and pigment, more particularly, a paint formulation comprising an aqueous dispersion of polymer particles with acorn morphology, wherein the pigment volume concentration of the formulated paint is at least 11.

Emulsion polymers that are useful as vehicles for coatings applications are well-documented in the prior art, but there is an on-going need to develop new binder systems that exhibit improved and/or differentiated performance, such as hot-block resistance, relative to the current state of the art.

SUMMARY OF THE INVENTION

The present invention addresses a need in the art by providing a composition comprising 1) an aqueous dispersion of polymer particles having a particle size as measured by dynamic light scattering in the range of from 40 nm to 300 nm, wherein the polymer particles have a core-shell morphology wherein the core protuberates from the shell; wherein the core comprises less than 0.09 structural units of a phosphorus acid monomer, based on the weight of the core; wherein the weight-to-weight ratio of the shell to the core is in the range of from 3:1 to 50:1; and 2) pigment particles with a refractive index in the range of from 2.0 and 3.0, wherein the pigment volume concentration of the pigment particles is at least 11. The composition of the present invention is useful for improving block resistance in coatings applications.

DETAILED DESCRIPTION OF THE INVENTION

The present invention is a composition comprising 1) an aqueous dispersion of polymer particles having a particle size as measured by dynamic light scattering in the range of from 40 nm to 300 nm, wherein the polymer particles have a core-shell morphology wherein the core protuberates from the shell; wherein the core comprises less than 0.09 structural units of a phosphorus acid monomer, based on the weight of the core; wherein the weight-to-weight ratio of the shell to the core is in the range of from 3:1 to 50:1; and 2) pigment particles with a refractive index in the range of from 2.0 and 3.0, wherein the pigment volume concentration of the pigment particles is at least 11.

The polymer particles are characterized by having acorn morphology whereby the core protuberates from the shell.

The polymer particles are preferably acrylic, styrene-acrylic, or vinyl ester-acrylic polymer particles (including vinyl acetate-acrylic and vinyl versatate-acrylic polymers).

The protuberating core portion of the polymer particles preferably comprises from 10 to 90 weight percent structural units of a styrene or acrylate monomer or combinations thereof. As used herein, acrylate monomer refers to acrylates such as ethyl acrylate, butyl acrylate, and 2-ethylhexyl acrylate, as well as methacrylates such as methyl methacrylate and butyl methacrylate. As used herein, the term "structural unit" of the named monomer, refers to the remnant of the monomer after polymerization. For example, a structural unit of methyl methacrylate is as illustrated:

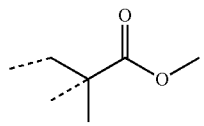

structural unit of methyl methacrylate, where the dotted lines represent the points of attachment of the structural unit to the polymer backbone.

The core preferably comprises structural units of i) methyl methacrylate, butyl methacrylate, or styrene or a combination thereof; and ii) ethyl acrylate, butyl acrylate, or 2-ethylhexyl acrylate or a combination thereof. A more preferred combination of bulk monomers is methyl methacrylate or styrene or a combination thereof with ethyl acrylate, butyl acrylate, or 2-ethylhexyl acrylate or a combination thereof, with methyl methacrylate and butyl acrylate being especially preferred.

The core portion of the polymer particles preferably comprises less than 0.05, more preferably less than 0.01, and most preferably 0 weight percent of a phosphorus acid monomer. As used herein, a phosphorus acid monomer refers to a phosphonate or a dihydrogen phosphate ester of an alcohol in which the alcohol contains or is substituted with a polymerizable vinyl or olefinic group. The core portion preferably comprises structural units of a carboxylic acid monomer and/or a sulfur acid monomer and/or salts thereof at a combined concentration in the range of from 0.1 to 10 weight percent, based on the weight of the core. When present, the concentration of structural units of the carboxylic acid monomer or the salt thereof is preferably in the range of from 0.1, more preferably from 0.5 weight percent, to 5, more preferably to 3 weight percent, based on the weight of the core; similarly, when present, the concentration of structural units of the sulfur acid monomer or the salt thereof is preferably in the range of from 0.1, more preferably from 0.5 weight percent, to 5, more preferably to 3 weight percent, based on the weight of the core.

Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, as well as salts thereof. Preferably, the core comprises structural units of a carboxylic acid monomer or a salt thereof and structural units of a sulfur acid monomer or a salt thereof; more preferably the core comprises methacrylic acid or a salt thereof and a salt of styrene sulfonic acid, more particularly sodium 4-vinylbenzenesulfonate, at a combined concentration in the range of from 1 to 10 weight percent, based on the weight of the core.

The core further preferably comprises from 0.1, more preferably from 0.3, and most preferably from 0.5 weight percent, to preferably 5, and more preferably to 3 weight percent structural units of a multiethylenically unsaturated monomer, based on the weight of the core. An example of a preferred multiethylenically unsaturated monomer is a diethylenically unsaturated monomer such as allyl methacrylate or divinyl benzene.

The core may also include from 0.1 to 10 weight percent, based on the weight of the core, of structural units of any of a number of monomers (excluding phosphorus acid monomers) such as styrenes, including styrene; an ethylenically unsaturated keto-functionalized monomer such as acetoacetoxyethyl methacrylate or diacetone acrylamide; a silicon-containing ethylenically unsaturated monomer including vinylalkoxysilanes such as vinyltrimethoxysilane; vinylalkylalkoxysilanes such as vinylmethyldimethoxysilane or vinyldimethylmethoxysilane; an ethylenically unsaturated ureido functionalized monomer such as ureido methacrylate; an ethylenically unsaturated amino-functionalized monomer such as lysine methacrylate or 2-(dimethylamino)ethyl methacrylate; an acrylamide such as acrylamide or N-isopropylacrylamide; a methacrylamide; acrylonitrile; or an ethylenically unsaturated hydroxyl-functionalized monomer such as 2-hydroxyethyl methacrylate or 2-hydroxyethyl acrylate. The core may also include from structural units of a fluoroalkylated monomers such as those illustrated by the following formulas:

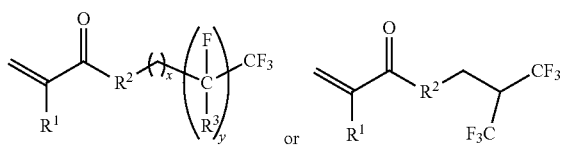

where $R^1$ is H or methyl; $R^2$ is O, S, or $NR^4$; $R^3$ is H or F; and x is 1 or 2, preferably 1; and y is from 0, preferably from 1, to 10, preferably to 5, and more preferably 2; where $R^4$ is H or methyl. $R^2$ is preferably O; $R^3$ is preferably F.

The core preferably has a volume average diameter in the range of from 20, more preferably from 30, and most preferably from 40 nm, to 90, more preferably to 80 nm (as measured by a BI-90 Dynamic Light Scattering Particle Analyzer).

The shell of the polymer particles preferably further comprises 1) methyl methacrylate or styrene or a combination thereof, preferably at a total concentration in the range of from 20, more preferably from 30, and most preferably from 40 weight percent, to 70, more preferably to 60, and most preferably to 55 weight percent, based on the weight of the shell; and 2) structural units of butyl acrylate, 2-ethylhexyl acrylate, or ethyl acrylate or a combination thereof, more preferably structural units of butyl acrylate, preferably at a total concentration in the range of from 20, more preferably from 30, and most preferably from 40 weight percent; to preferably 70, more preferably to 65, and most preferably to 60 weight percent based on the weight of the shell.

The shell of the polymer particles may comprise from 0.01 to 0.5 weight percent structural units of a phosphorus acid monomer, which is a phosphonate or dihydrogen phosphate ester of an alcohol in which the alcohol contains or is substituted with a polymerizable vinyl or olefinic group, such as phosphoethyl methacrylate (PEM). The shell most preferably includes 0 weight percent structural units of a phosphorus acid monomer.

The composition further comprises pigment particles with a refractive index in the range of from 2.0 and 3.0, such as ZnO and $TiO_2$, preferably $TiO_2$, at a pigment volume concentration (PVC) of at least 11, preferably from 11, more preferably from 12, to preferably 30, more preferably to 25, and most preferably to 20. PVC is calculated as follows:

$$PVC = \left[\frac{\text{Pigment Volume}}{\text{Pigment Volume} + \text{Total Solid Volume}}\right] \times 100$$

In a preferred method of making the aqueous dispersions of polymer particles, a first monomer emulsion is advantageously prepared by contacting water, butyl acrylate, methyl methacrylate or styrene, allyl methacrylate, sodium 4-vinylbenzenesulfonate, and methacrylic acid under emulsion polymerization conditions to form a precursor to the protuberating core. The precursor to the protuberating core (the preform) is isolated and characterized. Then, water, the precursor, and a monomer emulsion of butyl acrylate, methyl methacrylate, methacrylic acid, sodium 4-vinylbenzenesulfonate are reacted in a separate and distinct step from the polymerization of the precursor under emulsion polymerization conditions to form the stable aqueous dispersion of polymer particles with acorn morphology.

In another preferred method of making the aqueous dispersion, the polymer particles are made via a two-stage approach where a first monomer emulsion is advantageously prepared by contacting water, butyl acrylate, methyl methacrylate or styrene, allyl methacrylate, sodium 4-vinylbenzenesulfonate, and methacrylic acid under emulsion polymerization conditions to form a dispersion of polymer particles. In the same reactor, the dispersion of polymer particles is then reacted with a second monomer emulsion of butyl acrylate, methyl methacrylate, methacrylic acid, and sodium 4-vinylbenzenesulfonate under emulsion polymerization conditions to form the stable aqueous dispersion of polymer particles with acorn morphology.

The composition may include other ingredients selected from the group consisting of dispersants, pigments, defoamers, surfactants, solvents, additional binders, extenders, coalescents, biocides, opaque polymers, and colorants. It has been surprisingly discovered that pigmented aqueous dispersions of polymer particles with acorn morphology and a substantial absence of phosphorus acid functionalization show improved block resistance as compared to pigmented aqueous dispersions of spherical particles or pigmented aqueous dispersions of acorns containing phosphorus acid functionalization.

EXAMPLES

Intermediate Example 1

Aqueous Dispersion Acorn Polymer Particles with a Sulfur Acid Functionalized Core A. Core (Preform) Synthesis A first monomer emulsion was prepared by mixing deionized water (200 g), Disponil FES 993 surfactant (64 g, 30% active), butyl acrylate (371.2 g), methyl methacrylate (211.2 g), allyl methacrylate (12.8 g), sodium 4-vinylbenzenesulfonate (35.56 g, 90% active), and methacrylic acid (12.8 g).

To a 5-L, four necked round bottom flask equipped with a paddle stirrer, a thermometer, $N_2$ inlet, and a reflux condenser was added deionized water (600 g) and Disponil FES 32 surfactant (21.3 g, 30% active). The contents of the flask were heated to 85° C. under $N_2$ and stirring was initiated. A portion of the first monomer emulsion (70 g) was then added, quickly followed by a solution of ammonium persulfate (2.6 g) dissolved in deionized water (30 g) followed by a rinse of deionized water (5 g). After stirring for 10 min, a) the remainder of the first monomer emulsion, followed by a rinse (25 g), and b) an initiator solution of ammonium persulfate (0.64 g) dissolved in deionized water (24 g) were added linearly and separately over 40 min and 50 min, respectively. After the monomer emulsion feed was complete, the contents of the flask were held at 85° C. for 10 min, after which time the co-feed was complete; and the contents of the flask were then held at 85° C. for an additional 10 min.

The contents of the flask were cooled to 70° C. and a catalyst/activator pair was added to the flask to reduce residual monomer. The polymer was then neutralized to pH 3 with a dilute ammonium hydroxide solution. The measured particle size using a Brookhaven BI 90 Plus particle analyzer was 73 nm and the solids were 40.2%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.3 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated. A portion of the preform from Step A was then added (425 g, 10% of total monomer based on the finished polymer), followed by a solution of ammonium persulfate (5.1 g) dissolved in deionized water (20 g), and a rinse of deionized water (5 g). After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair and an anionic surfactant were added to the flask to reduce residual monomer. The polymer was then neutralized to pH 8.8 with a dilute ammonium hydroxide solution. The measured particle size using a Brookhaven BI 90 Plus particle analyzer was 132 nm and the solids were 46.9%.

Intermediate Example 2

Aqueous Dispersion Acorn Polymer Particles with a Sulfur Acid Functionalized Core and Phosphorus Acid Functionalized Shell The polymerization was conducted substantially as described in Intermediate Example 1, with the following modification: 30 min into the feed of the second monomer emulsion, phosphoethyl methacrylate (25.5 g, 60% active) followed by a rinse of deionized water (25 g) was added to the second monomer emulsion.

The measured particle size using a Brookhaven BI 90 Plus particle analyzer was 136 nm and the solids were 46.5%.

Intermediate Example 3

Aqueous Dispersion Acorn Polymer Particles with a Fluoroalkyl and Styryl Functionalized Core A. Core (preform) Synthesis A first monomer emulsion was prepared by mixing deionized water (200 g), Disponil FES 993 surfactant (64 g, 30% active), butyl acrylate (203.2 g), styrene (203.2 g), 2,2,2-trifluoroethyl methacrylate (192 g), allyl methacrylate (9.6 g), sodium 4-vinylbenzenesulfonate (17.78 g, 90% active), and methacrylic acid (16 g).

To a 5-L, four necked round bottom flask equipped with a paddle stirrer, a thermometer, $N_2$ inlet, and a reflux condenser was added deionized water (600 g) and Disponil FES 32 surfactant (21.3 g, 30% active). The contents of the flask were heated to 85° C. under $N_2$ and stirring was initiated. A portion of the first monomer emulsion (70 g) was then added, quickly followed by a solution of ammonium persulfate (2.6 g) dissolved in deionized water (30 g) followed by a rinse of deionized water (5 g). After stirring for 10 min, a) the remainder of the first monomer emulsion, followed by a rinse (25 g), and b) an initiator solution of ammonium persulfate (0.64 g) and ammonium hydroxide (1 g, 29% active) dissolved in deionized water (24 g) were added linearly and separately over 40 min and 50 min respectively. After the monomer emulsion feed was complete, the contents of the flask were held at 85° C. for 10 min, after which time the co-feed was complete; and the contents of the flask were then held at 85° C. for an additional 10 min.

The contents of the flask were cooled to 70° C. and a catalyst/activator pair was added to the flask to reduce residual monomer. The polymer was then neutralized to pH 4.5 with a dilute ammonium hydroxide solution. The measured particle size using a Brookhaven BI 90 Plus particle analyzer was 59 nm and the solids were 40.2%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.3 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated. A portion of the preform from Step A was then added (425 g, 10% of total monomer based on the finished polymer), followed by a solution of ammonium persulfate (5.1 g) dissolved in deionized water (20 g), and a rinse of deionized water (5 g). After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair and an anionic surfactant were added to the flask to reduce residual monomer. The polymer was then neutralized to pH 8.8 with a dilute ammonium hydroxide solution. The measured particle size using a Brookhaven BI 90 Plus particle analyzer was 125 nm and the solids were 46.7%.

Intermediate Example 4

Aqueous Dispersion Acorn Polymer Particles with a Fluoroalkyl, Styryl Core and Phosphorus Acid Functionalized Shell The polymerization was conducted substantially as described in Intermediate Example 3, with the following modification: 30 min into the feed of the second monomer emulsion, phosphoethyl methacrylate (25.5 g, 60% active) followed by a rinse of deionized water (25 g) was added to the second monomer emulsion. The measured particle size using a Brookhaven BI 90 Plus particle analyzer was 129 nm and the solids were 46.5%.

Intermediate Example 5

Aqueous Dispersion Acorn Polymer Particles with a Fluoroalkyl Functionalized Core A. Core (preform) Synthesis A first monomer emulsion was prepared by mixing deionized water (200 g), Disponil FES 993 surfactant (64 g, 30% active), butyl acrylate (320 g), methyl methacrylate (86.4 g), 2,2,2-trifluoroethyl methacrylate (192 g), allyl methacrylate (9.6 g), sodium 4-vinylbenzenesulfonate (17.78 g, 90% active), and methacrylic acid (16 g).

To a 5-L, four necked round bottom flask equipped with a paddle stirrer, a thermometer, $N_2$ inlet, and a reflux condenser was added deionized water (600 g) and Disponil FES 32 surfactant (21.3 g, 30% active). The contents of the flask were heated to 85° C. under $N_2$ and stirring was initiated. A portion of the first monomer emulsion (70 g) was then added, quickly followed by a solution of ammonium persulfate (2.6 g) dissolved in deionized water (30 g) followed by a rinse of deionized water (5 g). After stirring for 10 min, a) the remainder of the first monomer emulsion, followed by a rinse (25 g), and b) an initiator solution of ammonium persulfate (0.64 g) and ammonium hydroxide (1 g, 29% active) dissolved in deionized water (24 g) were added linearly and separately over 40 mins and 50 min, respectively. After the monomer emulsion feed was complete, the contents of the flask were held at 85° C. for 10 min, after which time the co-feed was complete; and the contents of the flask were then held at 85° C. for an additional 10 min.

The contents of the flask were cooled to 70° C. and a catalyst/activator pair was added to the flask to reduce residual monomer. The polymer was then neutralized to pH 4.5 with a dilute ammonium hydroxide solution. The measured particle size using a Brookhaven BI 90 Plus particle analyzer was 62 nm and the solids were 40.3%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated. A portion of the preform from Step A was then added (425 g, 10% of total monomer based on the finished polymer), followed by a solution of ammonium persulfate (5.1 g) dissolved in deionized water (20 g), and a rinse of deionized water (5 g of). After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair and an anionic surfactant were added to the flask to reduce residual monomer. The polymer was then neutralized to pH 8.8 with a dilute ammonium hydroxide solution. The measured particle size using a Brookhaven BI 90 Plus particle analyzer was 130 nm and the solids were 46.8%.

Intermediate Example 6

Aqueous Dispersion Acorn Polymer Particles with a Fluoroalkyl Functionalized Core and a Phosphorus-acid Functionalized Shell The polymerization was conducted substantially as described in Intermediate Example 5, with the following modification: 30 minutes into the feed of the second monomer emulsion, phosphoethyl methacrylate (25.5 g, 60% active) followed by a rinse of deionized water (25 g) was added to the second monomer emulsion. The measured particle size using a Brookhaven BI 90 Plus particle analyzer was 134 nm and the solids were 46.4%.

Comparative Intermediate Example 1

Aqueous Dispersion Acorn Polymer Particles with a Phosphorus Acid Functionalized Core A. Core (preform) Synthesis A first monomer emulsion was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-L, four necked round bottom flask equipped with a paddle stirrer, a thermometer, $N_2$ inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.6 g) dissolved in deionized water (30 g) followed by a rinse of deionized water (5 g). After stirring for 10 min, a) the remainder of the first monomer emulsion, followed by a rinse (25 g), and b) an initiator solution of sodium persulfate (0.64 g) dissolved in deionized water (50 g) were added linearly and separately over 40 mins and 50 mins, respectively. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size using a Brookhaven BI 90 Plus particle analyzer was 60-75 nm and the solids were 40%.

B. Acorn Core-Shell Synthesis

A second monomer emulsion was prepared using deionized water (400 g), sodium dodecylbenzene sulfonate (55.4 g, 23% active), Disponil FES 993 surfactant (42.5 g, 30% active), butyl acrylate (749.7 g), methyl methacrylate (759.9 g), methacrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (975 g). The contents of the flask were heated to 84° C. under $N_2$ and stirring was initiated. A portion of the preform from Step A was then added (425 g, 10% of total monomer based on the finished polymer), followed by a solution of ammonium persulfate (5.1 g) dissolved in deionized water (20 g), and a rinse of deionized water (5 g). After stirring for 5 min, the second monomer emulsion and a solution containing ammonium persulfate (1.7 g) and ammonium hydroxide (2 g, 29% active) dissolved in deionized water (60 g), were each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair and an anionic surfactant were added to the flask to reduce residual monomer. The polymer was then neutralized to pH 8.8 with a dilute ammonium hydroxide solution. The measured particle size using a Brookhaven BI 90 Plus particle analyzer was 136 nm and the solids were 46.7%.

Comparative Intermediate Example 2

Aqueous Dispersion Acorn Polymer Particles with a Phosphorus Acid Functionalized Core and a Phosphorus Acid Functionalized Shell The polymerization was conducted substantially as described in Comparative Example 1, with the following modification—30 minutes into the feed of the second monomer emulsion, phosphoethyl methacrylate (25.5 g, 60% active) followed by a rinse of deionized water (25 g) was added to the second monomer emulsion.

The measured particle size using a Brookhaven BI 90 Plus particle analyzer was 142 nm and the solids were 46.6%.
Paint Formulations Paint formulations with a TiO$_2$ PVC of 20 (total PVC=20) were prepared as shown in Table 1. Latex refers to Intermediate Examples 1-6 and Comparative Intermediate Examples 1 and 2. TAMOL and ACRYSOL are Trademarks of The Dow Chemical Company or Its Affiliates.

TABLE 1

Paint Formulation

| Material Name | Pounds | Gallons |
|---|---|---|
| Gloss Formulation | | |
| Grind | | |
| Water | 40.0 | 4.8 |
| BYK-022 Defoamer | 1.0 | 0.1 |
| Surfynol CT-111 Grind Aid | 3.3 | 0.4 |
| TAMOL ™ 2011 Dispersant | 8.8 | 1.0 |
| Ti-Pure R-746 TiO$_2$ | 314.2 | 16.2 |
| Grind Sub-total | 367.3 | 22.5 |
| Let-Down | | |
| Latex | 538.9 | 60.7 |
| Water | — | — |
| BYK-024 Defoamer | 5.0 | 0.6 |
| Texanol Coalescent | 27.3 | 3.4 |
| Ammonia (28%) | 0.0 | 0.0 |
| ACRYSOL ™ RM-2020 NPR Rheology Modifier | 26.2 | 3.0 |
| ACRYSOL ™ RM-8W Rheology Modifier | 2.7 | 0.3 |
| Water | 79.0 | 9.5 |
| Totals | 1046.3 | 100.0 |

Block Test Method

ASTM D4946-89 was followed to perform peel block resistance. For each coating, eight 1.5"×1.5" sections were cut from the chart to run duplicates for room temperature and hot block. Two each of the cut squares were placed face-to-face, with paint surfaces in contact with each other. For room temperature block testing, for each pair of square on a flat surface, a rubber stopper (No. 8) was placed on the top with the narrow side in contact with the specimens. A 1000-g weight was placed on the top of the stopper. After 30 min, the weights and stoppers were removed from the specimens, which were then tested for room temperature block resistance. For hot block, specimens were placed in an oven at 50° C. on a flat metal plate. Rubber stoppers (No. 8) and weights were equilibrated in the oven. A rubber stopper was placed with narrow side down on top each specimen in the oven. Then, a 1000-g weight was placed over each stopper. After 30 min, weights and stoppers were removed and the specimens were removed from the oven and allowed to cool at room temperature for 30 min before testing for hot block resistance. The results of room temperature block and hot block were reported on a scale of 0 to 10 by peeling apart the specimens with slow and steady force. Table 2 describes the rating system for reporting peel block resistance.

TABLE 2

Rating System for Peel Block Resistance

| Rating | Description of tack and seal |
|---|---|
| 10 | No tack, perfect |
| 9 | Trace tack, excellent |
| 8 | Slight tack, very good |
| 7 | Slight tack, good |
| 6 | Moderate tack, good |
| 5 | Moderate tack, fair |
| 4 | Severe tack, no seal, fair |
| 3 | 5-25% seal, poor |
| 2 | 25-50% seal, poor |
| 1 | 50-75% seal, poor |
| 0 | Complete seal, very poor |

Table 3 illustrates the block resistance results for compositions with acorn morphology latex particles with and without phosphoethyl methacrylate (PEM) in the core. The Example numbers correspond with the Intermediate and Comparative Intermediate Example numbers above.

TABLE 3

Block Resistance for Coatings with and without PEM in the Core

| | Peel Block Resistance | | | |
|---|---|---|---|---|
| | Room Temp Block | | Oven Hot Block | |
| Example No. | 1 d | 7 d | 1 d | 7 d |
| Example 1 | 8 | 9 | 7 | 8 |
| Example 2 | 6 | 8 | 5 | 6 |
| Example 3 | 8 | 9 | 7.5 | 8 |
| Example 4 | 8 | 9 | 6.5 | 7 |
| Example 5 | 8 | 9 | 7.5 | 8 |
| Example 6 | 8 | 9 | 6 | 7 |
| Comp. Ex. 1 | 5 | 8 | 5 | 5 |
| Comp. Ex 2 | 5 | 8 | 4.5 | 5 |

The results show that block resistance is best when no PEM is present in the core or the shell (Examples 1, 3, and 5) and that latexes with PEM functionality in the shell but not the core (Examples 2, 4, and 6) show improved block resistance over latexes with PEM functionality in the core (Comparative Example 1) or PEM functionality in the shell and the core (Comparative Example 2).

The invention claimed is:

1. A composition comprising 1) an aqueous dispersion of polymer particles having a particle size as measured by dynamic light scattering in the range of from 40 nm to 300 nm, wherein the polymer particles have a core-shell morphology wherein the core protuberates from the shell; wherein the core comprises less than 0.09 weight percent of structural units of a phosphorus acid monomer, based on the weight of the core; wherein the weight-to-weight ratio of the shell to the core is in the range of from 3:1 to 50:1; and 2) pigment particles with a refractive index in the range of from 2.0 and 3.0, wherein the pigment volume concentration of the pigment particles is at least 11.

2. The composition of claim 1 wherein the polymer particles are acrylic, styrene-acrylic, or vinyl ester-acrylic polymer particles and the core comprises less than 0.05 weight percent of structural units of a phosphorus acid monomer, based on the weight of the core.

3. The composition of claim 2 wherein the core comprises from 10 to 90 weight percent structural units of a styrene or acrylate monomer, or combinations thereof.

4. The composition of claim 3 wherein the core comprises structural units of i) methyl methacrylate, butyl methacrylate, or styrene or a combination thereof; and ii) ethyl acrylate, butyl acrylate, or 2-ethylhexyl acrylate or a combination thereof; wherein the core further comprises from 0.1 to 10 weight percent of at least one acid monomer selected from the group consisting of sulfur acid and carboxylic acid monomers.

5. The composition of claim 4 wherein the core comprises structural units of a sulfur acid monomer and a carboxylic acid monomer at a combined concentration in the range of from 1 to 10 weight percent, based on the weight of the core; wherein the core further comprises less than 0.01 weight percent of structural units of a phosphorus acid monomer.

6. The composition of claim 5 wherein the sulfur acid monomer is sodium 4-vinylbenzenesulfonate and the carboxylic acid monomer is methacrylic acid.

7. The composition of claim 3 wherein the pigment particles are $TiO_2$ particles and the pigment volume concentration of the $TiO_2$ particles is from 12 to 30.

8. The composition of claim 7 wherein the core further comprises from 0.1 to 10 weight percent, based on the weight of the core, of structural units of a monomer selected from the group consisting of styrene; an ethylenically unsaturated keto functionalized monomer; a silicon-containing ethylenically unsaturated monomer; an ethylenically unsaturated ureido functionalized monomer; an ethylenically unsaturated amino-functionalized monomer; an acrylamide; a methacrylamide; acrylonitrile; and an ethylenically unsaturated hydroxyl-functionalized monomer.

9. The composition of claim 7 wherein the shell comprises from 20 to 70 weight percent, based on the weight of the shell, structural units of a first monomer which is styrene or methyl methacrylate or a combination thereof; and from 20 to 65 weight percent, based on the weight of the shell, structural units of a second monomer which is butyl acrylate, 2-ethylhexyl acrylate, or ethyl acrylate or a combination thereof.

10. The composition of claim 9 wherein the shell comprises from 30 to 55 weight percent structural units of methyl methacrylate based on the weight of the shell; and 40 to 60 weight percent structural units of butyl acrylate based on the weight of the shell.

* * * * *